United States Patent [19]

Sain et al.

[11] 3,992,892

[45] Nov. 23, 1976

[54] AIR FILTRATION CHUTE

[76] Inventors: Bernard S. Sain, 811 Thread Needle Lane No. 285; Jimmy H. Brieger, 14810 Bramblewood, both of Houston, Tex. 77024

[22] Filed: Aug. 13, 1975

[21] Appl. No.: 604,245

[52] U.S. Cl. ............................ 62/239; 62/440; 62/474; 98/40 C
[51] Int. Cl.² ............ B60H 3/04; F25D 11/00; F25B 43/00; F24F 7/00
[58] Field of Search ............ 62/93, 239, 263, 417, 62/419, 474, 440; 98/8, 10, 40 C; 34/225

[56] References Cited
UNITED STATES PATENTS

| | | | |
|---|---|---|---|
| 1,863,576 | 6/1932 | Morse et al. | 62/93 |
| 2,523,957 | 9/1950 | Kleist | 62/419 |
| 2,548,965 | 4/1951 | Gaugler | 62/474 |
| 2,622,414 | 12/1952 | Jaubert | 62/93 |
| 2,863,606 | 12/1958 | Tatsch | 98/40 C |
| 2,922,291 | 1/1960 | Fox et al. | 62/239 |
| 3,412,571 | 11/1968 | Bolynn | 62/419 |
| 3,792,595 | 2/1974 | Willis | 62/239 |
| 3,918,354 | 11/1975 | Lambert | 98/40 C |

Primary Examiner—Lloyd L. King
Attorney, Agent, or Firm—S. Stephen Baker

[57] ABSTRACT

A chute formed from a number of rigid panels supported by a support structure to define a duct for distributing and delivering cold air from a refrigeration unit located at one end of a cargo space such as a truck or railcar, toward substantially the other end, for treating cargos which require refrigeration such as perishable vegetables; fruits, plants or any food or similar products. In addition, the panels are formed to cleanse and to filter a portion of the distributed air by the incorporation of air treating or filtration agents within the panels.

12 Claims, 5 Drawing Figures

AIR FILTRATION CHUTE

PROBLEM AND PRIOR ART

Refrigerated trucks, containers, railcars, and various other types of cargo space have utilized a type of chute to channel the cold air from the blower section of a refrigeration unit to the cargo space to be cooled. Such refrigerated cargo space has associated therewith a refrigeration unit and connected blower unit to which one end of the chute is connected. The other end of the chute is open and in communication with the cargo space. Presently these known chutes are made of a textile material, e.g.; canvas, cotton or similar material. As a rule, these fabrics chutes are suspended from the ceiling or wall portion of the cargo space by snap fasteners or the like. These chutes extend approximately ⅔ of the length of the refrigerated cargo space. As these fabric chutes are flexible and suspended from the ceiling, they assume a semi-circular or catenary shape with reference to the ceiling of the cargo space.

The disadvantages of such chutes are many. They are constantly subjected to damage during loading due to the loading equipment, e.g.; a loading fork lift tearing the chute. Also during the operation of the refrigeration unit, some cool, moist air is constantly being channeled through the fabric chute. This causes the chute to become damp and moist. This moisture and dampness is extremely conducive to bacterial growth and the formation of slime along the inner surfaces of the chute. Thus when such chutes become so contaminated, the air passing thereover likewise becomes contaminated therefrom, and in turn the thus contaminated air is circulated throughout the entire cargo area. This condition obviously adversely affects the cargo contained within the refrigerated space.

Because of the labor involved in removing the chutes for cleaning and the cost thereof, experience has shown that such chutes are rarely, if ever, cleaned. In the event they are cleaned, the chutes are subjected to rot due to moisture and the inability of the fabric chute to be fully dried.

Another very critical problem which has been observed with such chutes is that when the cargo load is stacked too high within the cargo space, the stacked load further tends to push the flexible or non-rigid chute against the top of the cargo space, thus creating a blockage of air which prohibits proper refrigeration of the load within the cargo space.

OBJECTS

An object of this invention is to provide a more efficient method and apparatus for distributing cooled air throughout a cargo space, and further in which the cooled air can be treated in a manner to effect purification thereof as the cooled air is distributed throughout the cargo space.

Another object is to provide a rigid duct arrangement for effectively distributing and treating cooled air throughout a cargo space.

Another object is to provide a duct or chute which will resist compression and damage when a load is stacked too high in a cargo space.

Another object is to provide an improved chute construction whereby damaged or contaminated portions thereof can be readily replaced independently of other portions thereof.

Another object is to incorporate in the chute construction a treating agent to provide for air purification, moisture absorption and/or $CO_2$ absorption.

Another object is to provide an improved chute that is relatively simple to fabricate and which is positive in operation.

BRIEF SUMMARY OF INVENTION

The foregoing features and advantages are attained by a method and chute for treating and distributing cold air through a cargo space. The chute comprises opposed support members connected to a wall portion of a cargo space which together with a plurality of readily detachable panels supported thereby as the floor of said chute define a duct or passageway through which cooled air is distributed to the cargo space. The respective panels each comprise a rigid frame member which has connected to the opposed sides thereof an air pervious membrane or surface. Between the opposed membranes, there is preferably provided a treating agent for treating a portion of the air flowing therethrough.

One end of the chute is connected in communication with the blower outlet of a refrigeration unit. The other end is opened to the cargo space. Depending upon the treating agent utilized, the cooled air is also purified and/or relieved of its moisture content and/or $CO_2$ content. The arrangement is such that the cargo space is cooled by diffusing a lesser portion of the cooled air through the pervious membranes of the panels and the greater remainder being discharged through the open end of the duct.

FEATURES

A feature of this invention resides in the provision of an improved chute construction and further in which the air flowing therethrough can be treated so as to effect purification thereof as it is being distributed to the cargo space.

Another feature resides in the provision of a rigid panel construction to define the duct or chute.

Another feature resides in a chute which is constructed so as to resist any blockage of air flowing therethrough, and throughout the cargo space.

Other features and advantages will become more readily apparent when considered in view of the drawings and specification in which.

DETAILED DESCRIPTION

Figure 1:
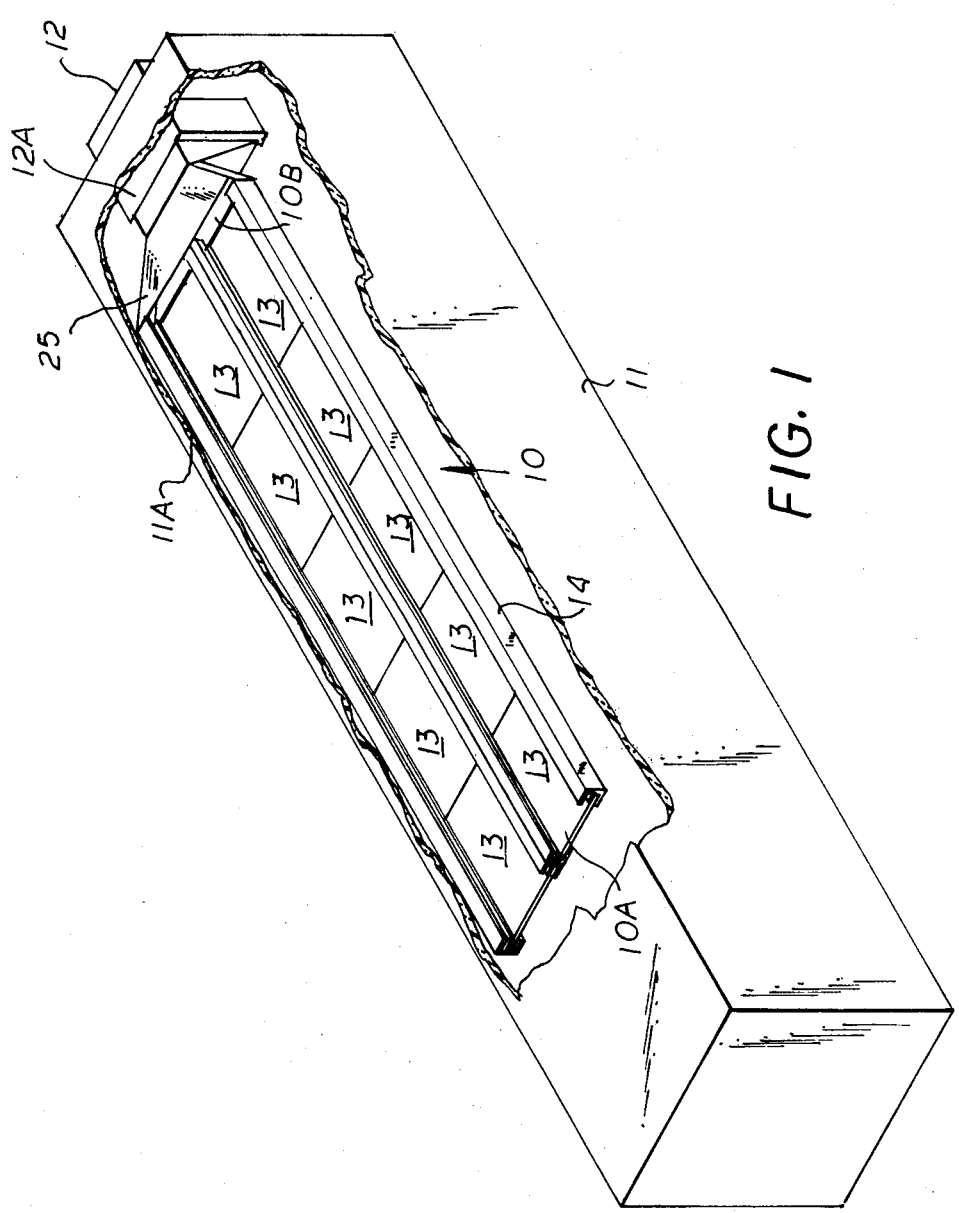
FIG. 1 is a perspective view of an air filtration chute embodying the invention as applied to a refrigerated cargo space; and having portions broken away and the chute attaching apertures omitted for purposes of clarity.

This invention is directed to a method and an air filtration chute construction 10 for distributing cooled and treated air to a cargo space 11, e.g., a refrigerated truck body, container, ship hold, railcar, etc. The method of distributing refrigerated air throughout a cargo space 11 comprises the steps of first generating cold air by a suitable conventional refrigeration unit 12 and thereafter blowing the generated cold air through a duct preferably having air pervious walls or panels 13. A lesser portion of the air is diffused directly through the series of adjacent, individual air pervious panels 13 extending along the length of a duct. The far greater remainder of the cooled air is discharged through an open end of the duct. The distributed cooled air is further treated in part so as to effect purification and/or to extract the moisture of $CO_2$ content thereof prior to distribution to the cargo space 11. This is attained by utilizing various chemicals and/or physical treating agents between the opposed surfaces or sides of the panels 13 making up the duct. The various treating agents selectively comprise activated carbon for effecting purification, molecular seives for cleaning the cooled air of any $CO_2$ and other related gases which may emanate from the evaporator section of the refrigeration unit, and/or silica gel for effecting the removal of moisture from the cooled air.

Referring to the drawings, there is shown a cargo space 11 which may comprise a truck body, cargo container, or the like. The illustrated cargo space 11 is rectangular in shape and is defined by insulated wall sections. Adjacent the front end of the container or cargo space 11 is a refrigeration unit 12. Associated with the refrigeration unit 12 is a blower section 12A for blowing the cooled air throughout the air filtration chute 10 of this invention and as herein described.

Figure 2:
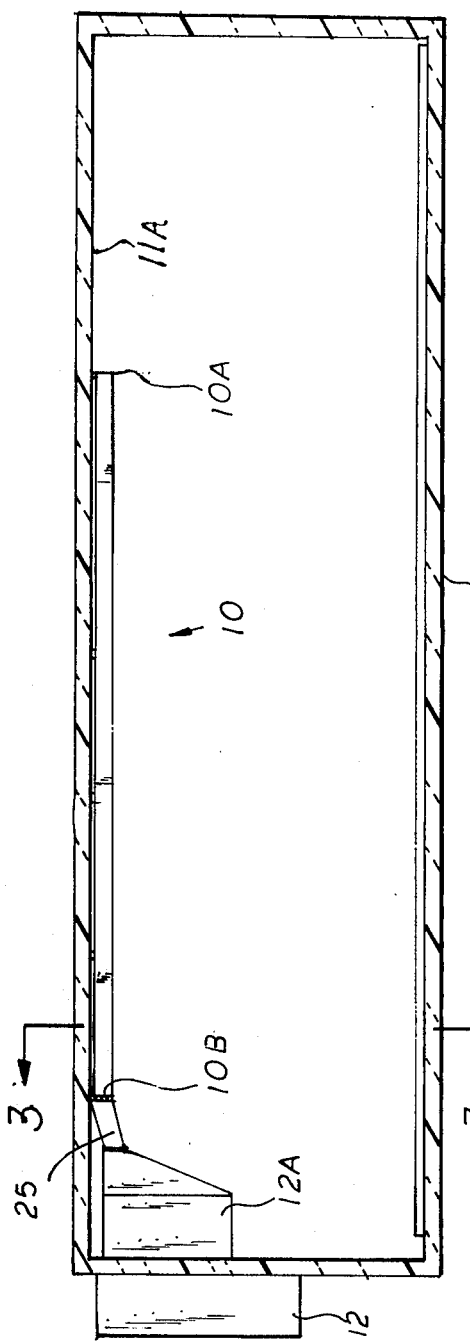
FIG. 2 is a side sectional view of FIG. 1.
Figure 3:
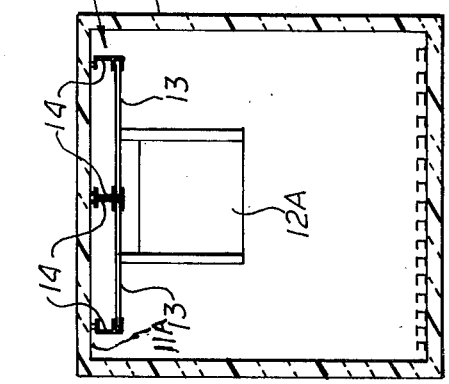
FIG. 3 is a sectional view taken on line 3—3 on FIG. 2.
Figure 4:
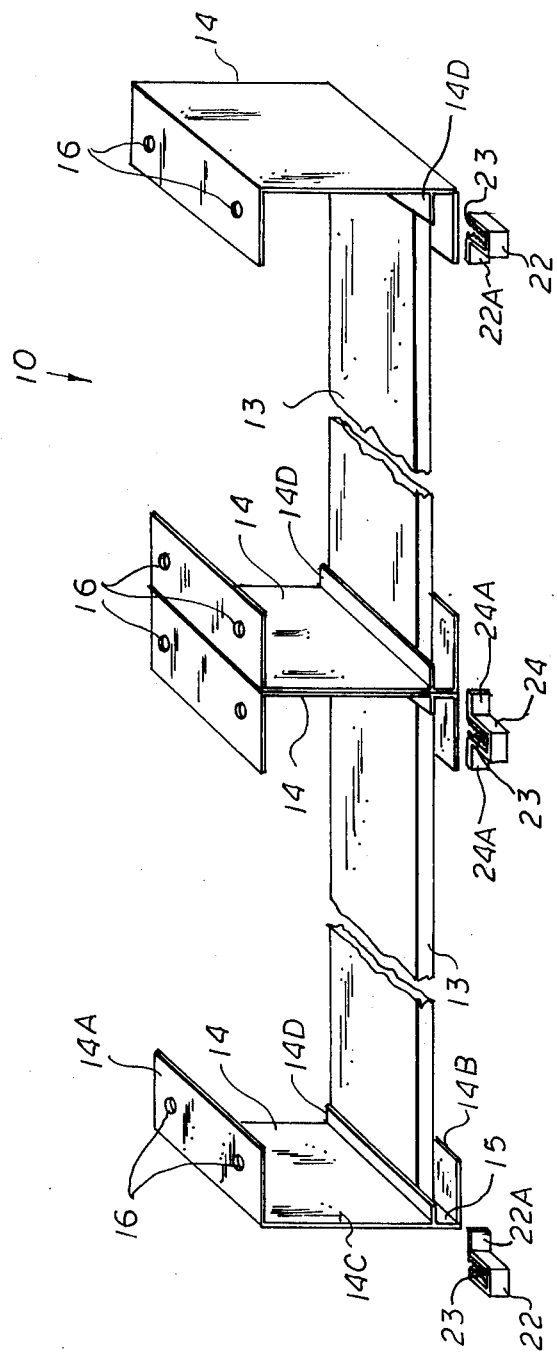
FIG. 4 is an enlarged fragmentary perspective substantially detailed view of the chute of FIG. 1.

The air filtration chute is defined by opposed elongated structural or support members 14—14 which extend longitudinally of the cargo space 11 adjacent and slightly below the ceiling 11A thereof. The respective support members 14 are substantially E shaped in cross-section. As shown in FIG. 4 two E shaped support members 14—14 are disposed in back to back, or side by side relationship to define a central support section which in many respects simulates an I beam type support. As seen in FIGS. 1 and 2, the support members 14—14 extend approximately ⅔ of the length of the cargo space. As noted in FIG. 4, each support member 14 has an inturned top and bottom flange 14A, 14B interconnected by a web 14C. An intermediate flange 14D forming the E shape, is spaced from the bottom flange 14B to define a slide or channel 15 for slideably receiving the panels 13. The upper flange 14A of the respective support members 14 are provided with spaced apertures 16 whereby they can be suitably suspended as by any type of bolt or clip as noted in FIG. 3, from the top or ceiling 11A of the cargo space 11.

Figure 5:
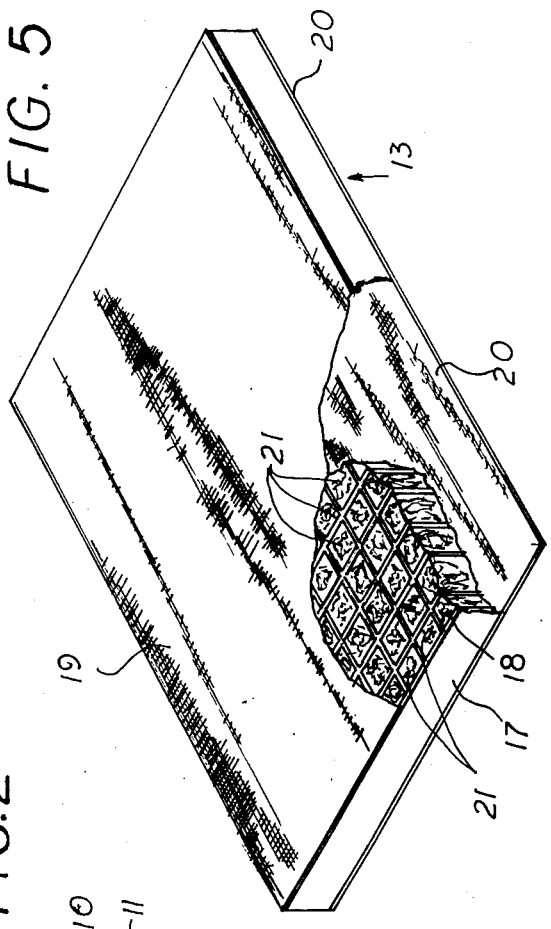
FIG. 5 is a perspective detail view of a chute panel, having parts broken away.

Extending between the opposed E shaped support members 14—14 and supported within lower opposed channels 15—15 are a plurality of chute panels 13 disposed in two adjacent rows as shown in FIG. 1. Referring more specifically to FIG. 5 each chute panel 13 comprises a rigid frame 17 of lattice construction throughout, which defines a series of pockets or sections 18. Connected across the top and bottom surfaces or sides of the frame 17 is an air pervious sheet or membrane 19 and 20. The membranes 19 and 20 in the illustrated embodiment comprise a fiberglass mesh through which air may readily pass through. The thickness of panels 13 is about ½ inch.

Disposed in the pocket 18 defined by the lattice frame 17 is an air treating agent 21. The air treating agent 21, can consist of activated carbon, molecular sieves and silica gel, singly or in combination as desired. However, this invention is primarily directed to structural features, some of which may incorporate the air treating agents. The specific nature of such agents is more fully set forth in the pending, sole inventor application of Bernard S. Sain, Ser. No. 545,422, filed Jan. 30, 1975, said Bernard S. Sain being one of the two joint inventors in the instant application.

It has been found that fruits, vegetables, or plants, after picking, will evolve gases such as ethylene and carbon dioxide. With the perishable products in confined condition, as in transport means or storage facilities, the evolved gases affect the rate of ripening of the fruits, vegetables, or plants, and in most cases, accelerate ripening of the product.

Accordingly, it was established, that the rate of ripening of the given products could be measurably diminished and adjusted for selected products. This is accomplished by providing adsorbent agents suitably distributed relative to the product loaded in the transport or storage means. In the case of ethylene gas, activated carbon is highly effective. If carbon dioxide is evolved, commercial products known as molecular sieves or hydrated lime may be used. Molecular sieves are well known in the art of chemistry. In this case, they are comprised of aluminum and sodium silicate complexes suitable for adsorbing evolved gases. They are preferably disposed in the form of pockets 18 such as are the other adsorbent agents herein described. Excess moisture may be removed by means of silica gel. It is understood that the amount of adsorbent agents used is calculated in terms of the specific fruit, vegetable, or plant being treated; the volume of the confining chamber and the volume of product therein; the degree of ripening of the product at the time of picking; and the transit times and temperatures. These calculations are well understood by those skilled in the art. Usually, a single panel 13 will contain a single adsorbent, not a combination of them. As to the calculations; examples are set forth in the above mentioned Sain sole application, and such examples may readily be adopted to serve in the structure of this application as far as treating the air is concerned, the specific amounts not being critical.

The activated carbon effects purification of the air stream passing through the chute 10 or panels 13. Thus, the activated carbon is effective in removing hydro-carbons, odors, and volatiles which may be given off by the mechanical refrigeration unit.

Molecular sieve is used in the panels 13 to effect the cleaning of the cooled air of $CO_2$ and other related gases or volatiles which may emanate from the evaporator section of the refrigeration unit, or be otherwise present.

Silica gel can also be used as a treating agent for effecting the removal of moisture from the cooled air thus reducing also completely the formation of slime and bacterial mold on the inner surfaces of the panels 13, which heretofore has been a common occurrence with the heretofore known canvas or fabric chutes.

A panel clip 22 is provided at the open end 10A of the chute 10 to secure the end most panel to prevent accidental displacement; see FIG. 4. As shown the end clips 22 comprise a U shape member having a lateral flange 22A. The inner surfaces of the U shaped clip are provided with serrations 23 to frictionally grip the web portion 14C of the end support members 14 to lock the end most panel in place. The central clip 24 is similar in construction except that it is formed with a pair of opposed flanges 24A, 24A. The respective opposed flanges 24A, 24A function to abut against the end most panels when the clip is secured to its associated support member.

The respective support members 14 are formed of either metal or plastic and as such are quite rigid. Because of this construction, the supports 14 will resist any compression of the chute when the load is stacked too high. Thus the described construction obviates the problem heretofore noted as blocking or compressing of the heretofore known canvas chutes.

The respective panels may be constructed so as to contain any of the foregoing mentioned treating agents 21 or any combination thereof in the various panels.

In the event any panel is damaged it can be readily replaced without the need of replacing the entire chute.

As best seen in FIGS. 1 and 2, the discharge end 10A is fully opened. The other end 10B which is the inlet end is suitable connected to the outlet section of the blower by a transition shroud 25. The transition shroud may be formed of a suitable flexible material having suitable fastening means for connection to the inlet 10B of the chute and to the outlet of the blower 12A. The fastening means may be any type of clips, shown as short horizontal lines in FIG. 2.

In operation it will be noted that cooled air is blown through the duct as it leaves the blower unit 12A. A portion of the cooled air is diffused through the air pervious surfaces or membranes 19 and 20 of the panels 13. In doing so, the air passing therethrough comes in contact with the treating agent 21 disposed in panels 13. In doing so, the air is purified, relieved of its moisture and/or cleansed of $CO_2$ depending upon the nature and function of the treating agent 21 as hereinbefore described. The remainder of the air is discharged into the cargo space through the open end 10A of chute 10, wherein the cooling air is thereafter recirculated throughout the cargo space 11 in the usual manner.

Most of the air, approximately 90%, will pass completely through the duct through the open end 10A.

The remainder or approximately 10% will filter through the panels.

The chute as described herein is applicable for use in trucks, railcars, etc., to refrigerate such cargos, e.g., perishable fruits, vegetables, meats, plants, and various other food products, produce, or similar products while in transit and/or during storage.

From the foregoing it will be noted that the described chute is not subjected to tearing, rotting or damage common to the known canvas chutes. The described chute can be readily repaired, and the use of the various treating agents in the respective panels provide additional benefits such as air purification, dryness, etc. Also the rigid construction of the chute obviates blockage of the air flow therethrough.

With the construction described, it will be noted that an important feature is that the panels can be readily replaced. Each panel is replaceable whether it should be broken or damaged for any reason, or whether its chemical agent is so saturated or used up that it loses its purifying or filtration characteristics. The panels are of rigid plastic, or equivalent material such as plastic coated cardboard, or the like.

While the invention has been described with respect to a particular embodiment thereof, variations and modifications may be made without departing from the spirit or scope of the invention. For example, the bottom membrane 20 need not necessarily be air pervious since the following air will also be cleansed to some degree when it simply passes over the air treating agent 21 through the air pervious membrane 19.

What is claimed is:

1. An air filtration system for refrigerating perishable goods comprising:
    a container defining a cargo space,
    a rigid duct disposed in said container,
    said duct including rigid support members extending along the length of said container,
    a panel structure supported by said support members as a wall of said duct for defining an air passageway,
    said duct having an inlet end adapted to be connected to a source of cold air,
    said duct having a discharge end in communication with the cargo space of said container,
    said panel structure comprising a plurality of individual and detachable panels, whereby selected ones of said panels may be removed and replaced as desired.

2. The invention as defined in claim 1, and wherein said panels lie side by side and form the floor of said duct.

3. The invention as defined in claim 1 and including air treating means disposed in said individual panels for treating a portion of the air flowing through said duct by cleansing and adsorbing gases from said air portion.

4. The invention as defined in claim 3 and wherein said means comprises an air treating agent selected from the group consisting of activated carbon, molecular sieve, and silica gel.

5. The invention as defined in claim 4, and wherein said panels form the floor of said duct, said panels having a plurality of pockets formed therein, said air treating means being disposed in said pockets.

6. The invention as defined in claim 5;
    and including an air pervious membrane connected to a side of said panels.

7. The invention as defined in claim 1;
    wherein said support members comprise a pair of opposed E shaped structural members, and means therein defining a lower channel along said structural members, said individual panels each lying side by side and each being slidably supported in said lower channel.

8. The invention as defined in claim 7 and including means disposed in said individual panels for treating at least a portion of the air flowing through said duct by adsorbing from said air portion gases evolved from the perishable goods.

9. An air filtration chute for use in a refrigerated container having a source for producing cold air comprising:
    a duct means for distributing cold air throughout the container, said duct means including a plurality of separate, individual rigid panels aligned to define an air passageway and forming a wall of said duct means,
    each of said panels including a rigid frame member,
    two air pervious membranes respectively connected to opposed sides of said frame member,
    and means disposed between said membranes for treating the cold air flowing through said duct means and through said panels.

10. The invention as defined in claim 9 wherein:
    said last named means comprises an air treating agent selected from the group consisting of activated carbon, molecular sieve, and silica gel.

11. The invention as defined in claim 10 wherein; said frame members comprise a rigid structure having imperforate circumscribing end walls, and having a plurality of pockets formed therebetween, said air pervious membranes being connected to opposed sides of said rigid structure, and said air treating agent being confined in said pockets.

12. An air filtration chute for use in a refrigerated container of perishable goods and having a source for producing cold air comprising:

a rigid duct means for distributing cold air throughout the container, said duct means including a plurality of separate, individual panels aligned to define an air passageway, said panels being detachable from said duct means whereby selected ones of said panels may be removed and replaced as desired, and air treating means disposed in said individual panels for treating a portion of the air flowing through said duct by cleansing and adsobing gases therefrom, said panels lying side by side and forming the floor of said duct means, said panels having a plurality of pockets formed therein, said air treating means being disposed in said pockets.

* * * * *